March 15, 1949. R. O. BALOGH ET AL 2,464,367
FLUID PRESSURE FOLLOW-UP SERVOMOTOR
Filed Sept. 24, 1946 2 Sheets-Sheet 1
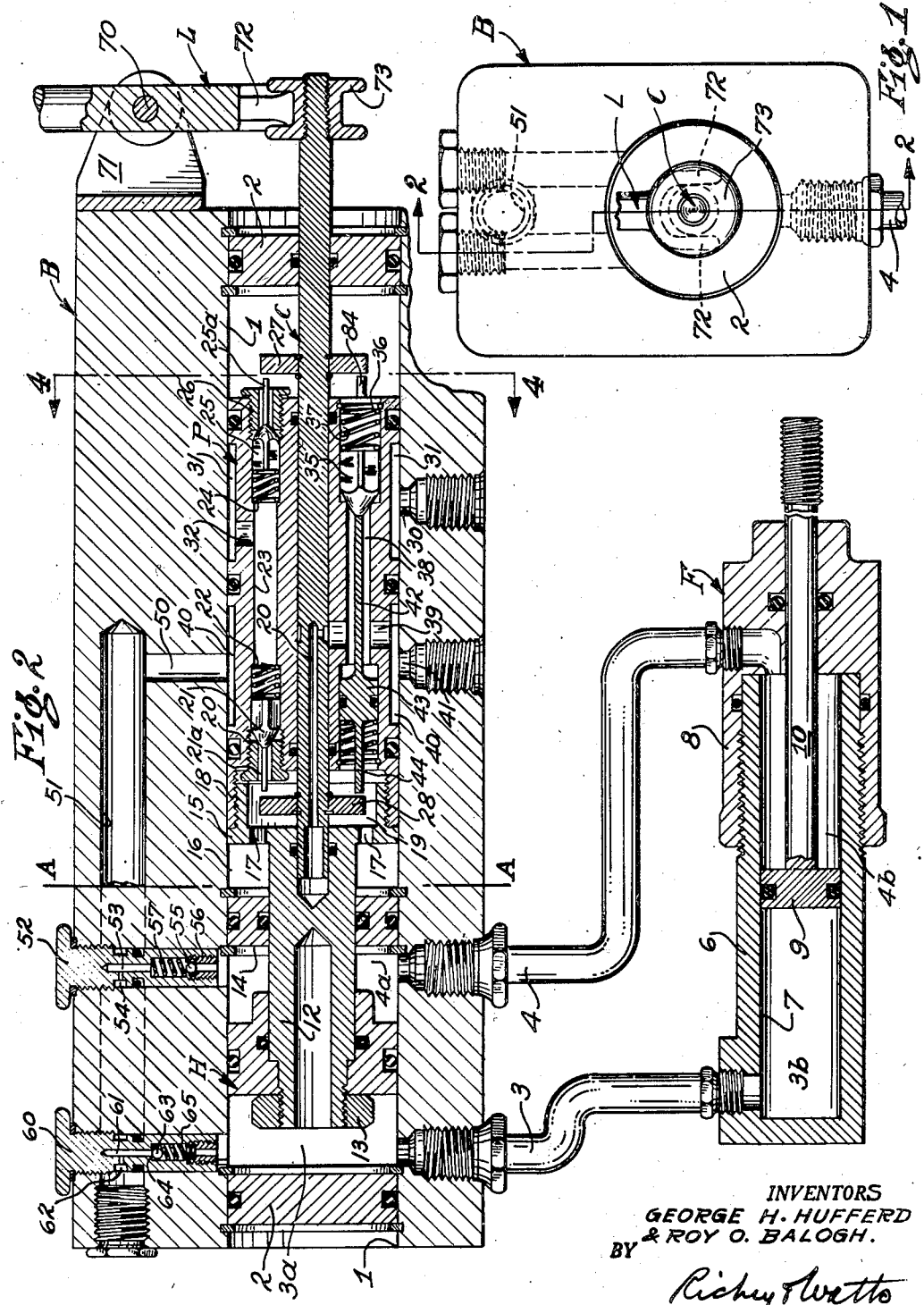
INVENTORS
GEORGE H. HUFFERD
& ROY O. BALOGH.
BY
Richey & Watts
ATTORNEYS March 15, 1949. R. O. BALOGH ET AL 2,464,367
FLUID PRESSURE FOLLOW-UP SERVOMOTOR
Filed Sept. 24, 1946 2 Sheets-Sheet 2
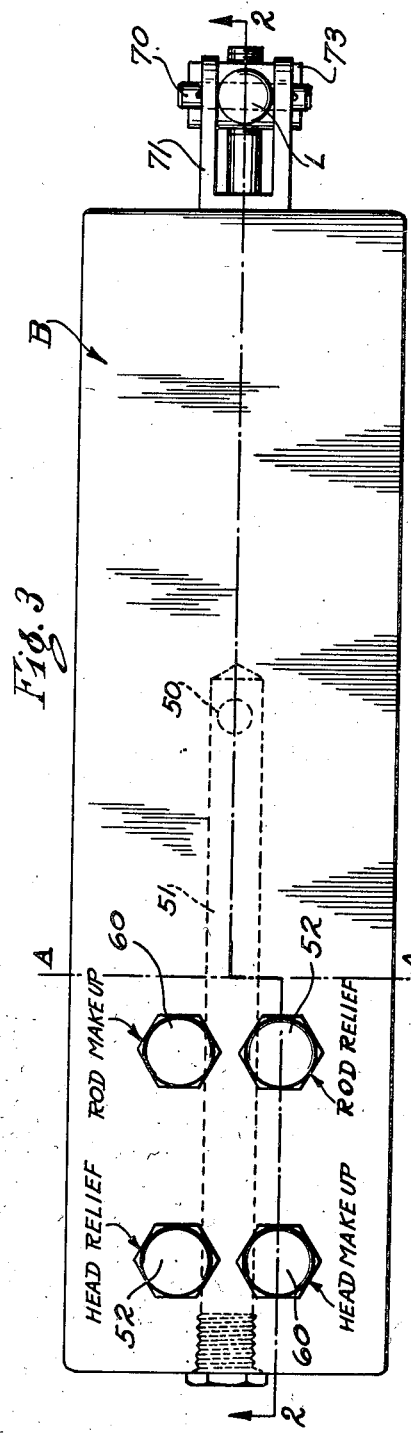
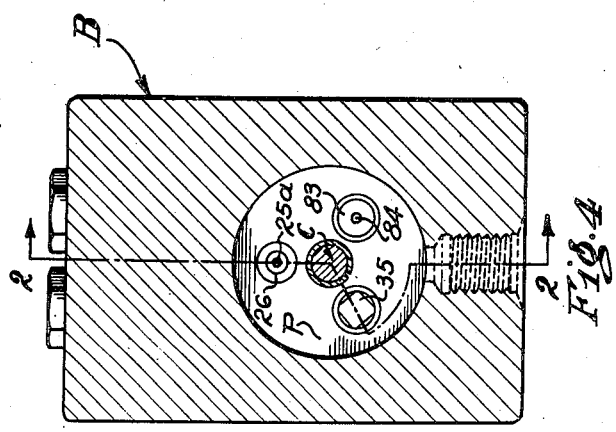
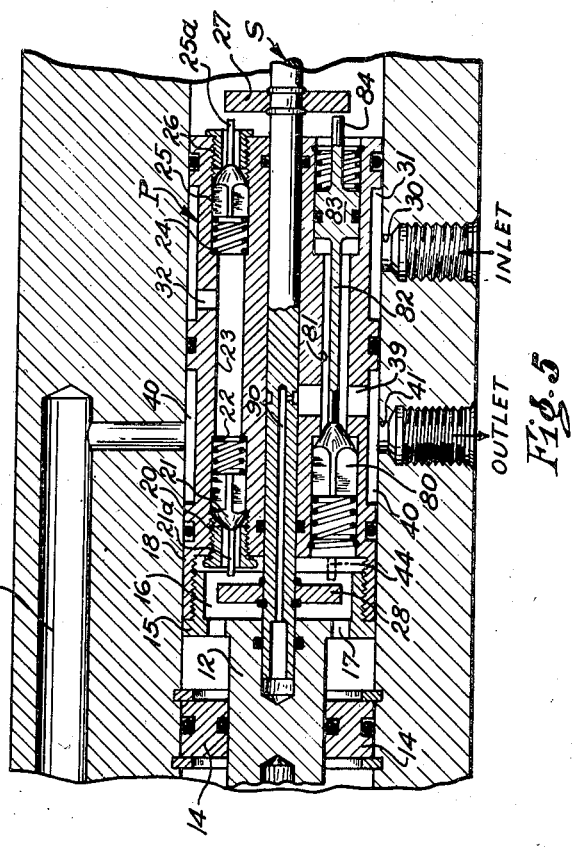
INVENTORS
GEORGE H. HUFFERD
& ROY O. BALOGH
BY
Richey & Watts
ATTORNEYS Patented Mar. 15, 1949

2,464,367

UNITED STATES PATENT OFFICE 2,464,367

FLUID PRESSURE FOLLOW-UP SERVOMOTOR

Roy O. Balogh, Cleveland, and George H. Hufferd, Shaker Heights, Ohio, assignors to The Weatherhead Company, Cleveland, Ohio, a corporation of Ohio Application September 24, 1946, Serial No. 699,030

4 Claims. (Cl. 121—41)

This invention relates to a hydraulic follow-up valve and associated elements wherein motion of a control lever is followed up by a hydraulic piston located at a remote point due to the action of a novel follow-up valve.

It is an object of this invention to provide a follow-up valve which is sensitive in its action and which is automatically self-centering in case there is any tendency of the valve to creep when the control handle is stationary. These and other objects will be apparent as the following detailed description of a preferred embodiment proceeds.

In the drawings:

Fig. 1 is an end view of the follow-up valve showing two of the check valves;

Fig. 2 is a longitudinal section on line 2—2 of Fig. 3 arranged to disclose the maximum number of basic parts in one plane. In order to present a section such as that shown in Fig. 2, rather irregular section lines were employed. That portion of Fig. 2 to the left of line A—A is taken on line 2—2 of Fig. 1 in order that the two check valves may be shown. That portion of Fig. 2 to the right of line A—A is taken on line 2—2 of Fig. 4 with the plunger check valve rotated 60° so that it lies in the vertical plane. This is clearly indicated on Fig. 4;

Fig. 3 is a plan view of the valve;

Fig. 4 is a transverse section taken on 4—4 of Fig. 2; and

Fig. 5 is a partial longitudinal section similar to that shown in Fig. 2 except that the other plunger check valve is shown in the figure.

The follow-up valve body B has a longitudinal bore I which is closed at each end by members 2 which may be retained by snap rings or by any conventional arrangement. Within the sealed chamber thus formed a follow-up plunger P is movably fitted. Plunger P, as will be described presently, responds to motion of the hand lever L and a double-acting master piston H circulates fluid through lines 3 and 4 to the follow-up or work cylinder F. The principle of operation is that when the plunger P follows the control lever L, fluid is expelled by the master piston from one of the associated chambers 3a or 4a and into one end of the follow-up receiver or work cylinder F. The other of the chambers 3a or 4a receives the excess fluid from the other end of the follow-up cylinder. In the work cylinder F, chambers 3b and 4b are formed on opposite sides of the double-acting piston, these chambers being connected to chambers 3a and 4a in the master cylinder. In structure, the body 6 in the work cylinder may have a bore 7 which forms the cylinder wall and an end member 8 may be threaded to body 6. Double-acting piston 9 and piston rod 10 complete the assembly. It will be noted that the piston rod end of the master cylinder and of the work cylinder are hydraulically connected to partially compensate for the volume of the piston rods.

In order that the master piston H may be moved back and forth in response to the control handle, pressure is admitted to one end or the other of the follow-up plunger P by the opening of one or the other of a pair of valves connected to a source of pressure. An arrangement which we have found to be satisfactory is such that an extension 12 of the plunger P retains the master piston H by means of a nut 13. A member 14 is retained in the bore I which forms the chamber 4a referred to previously. The plunger P is actually made in two parts which may be threaded together as at 18. The chamber 16 at one end of the plunger is formed between the fixed member 14 and the wall or end 15 of the plunger. Apertures 17 are provided in the wall 15 to permit fluid to enter the chamber 16 in order to move the plunger to the right. A chamber 19 is provided in the plunger to receive an operating pad 28 mounted on the control rod C.

A check valve seat member 20 is engaged by check valve 21 which has an operating stem 21a for operation by the pad 28. Spring 22 normally holds the check valve 21 in engagement with its seat. The bore 23 is connected to a source of fluid under pressure and the other end of the bore 23 is closed by a similar check valve 25. Valve 25 is held against a seat member 26 by a spring 24 so that the valve is normally closed. Pad 27 at the other end of the plunger is provided for operation of check valve 25.

A pump or other supply of fluid under pressure is connected to the inlet and port 30 communicates with an annular groove 31 which extends around the plunger. Groove 31 communicates with the longitudinal bore 23 in the plunger by means of port 32. Thus, it can be seen that when either check valve is opened, fluid under pressure can flow into one or the other of the chambers at the end of the plunger to cause the plunger to move in a certain direction, the direction of motion depending on which of the valves is opened. In order that the plunger can be moved hydraulically, fluid in the end not under pressure must be relieved or exhausted. This is accomplished by providing an exhaust check valve for each end of the plunger. The check valve 35 shown in Fig. 2 permits the plunger to move to the right. Spring 36 urges the valve 35 moving in aperture 37 against the valve seat. This check valve closes off bore 38 from its respective end of the plunger and bore 38 communicates by means of port 39 with the outlet port 41 which forms the exhaust or return circuit of the pressure supply system. A stem 42 is provided between the check valve 35 and a piston 43, the piston being provided to seal off the other end of the bore 38 from the associated end of the plunger at all times. An operating pin 44 extends from the piston 43 for cooperation with the pad 28 on the control rod C. The check valve shown in Fig. 2 functions when the control rod is pulled to the right, and when it is thus opened the right hand chamber at the end of the plunger is opened to the exhaust so that the plunger can be moved to the right without being hydraulically blocked. We prefer that the check valve pin be engaged before the operating valve pin is engaged in order that the static side of the plunger will be hydraulically unblocked before fluid under pressure is admitted to the plunger. A similar and symmetrical arranged check valve is shown in Fig. 5 which check valve functions when the control rod is moved to the left. The check valve 80 has a stem 82 which is positioned in the bore 81, the bore 81 connecting with the exhaust line. The plunger 83 seals off the bore 81 from the other side of the check valve and an operating pin 84 is provided. The function of valve 80 is like that described for valve 35 except that it is opened when the control rod is moved to the left.

In order that the control rod C will not be hydraulically blocked, we provide a passageway 90 which bleeds any fluid which might lead into the blind bore out into the exhaust system.

Throughout this description, we have omitted detailed reference to each seal provided in the assembly. We have illustrated numerous seals where they would be desirable but this is mere design practice and forms no part of my invention and for that reason we have not specifically referred to every seal ilustrated.

As the master piston H moves on its stroke it may be that leakage occurs in one or more of the chambers. If fluid is lost when the piston H is moved, there will be a vacuum created in the low pressure or return side and a make-up check valve is provided for each end of the master piston H to supply additional fluid. One of these valves is shown in Fig. 2 for the head end of the piston. It includes valve body 60 with a bore 61 which communicates by means of an annulus 62 with a longitudinal bore 51. Bore 51 has one end plugged and the other end joins bore 50 which, in turn, communicates with the annular groove 40 and hence with the exhaust. The ball 63 sets on seat 64 in response to pressure of spring 65. If, for example, the piston H were moved to the right and chamber 3a were deficient of fluid due to leakage in the system, a partial vacuum would be created and the check valve would admit additional fluid from the exhaust line. As can be seen in Fig. 3, a similar relief valve is provided for the chamber 4a in the master cylinder.

Each end of the master cylinder is also provided with a thermal or pressure relief valve which functions if an excessive pressure is developed or if fluid expands due to temperature changes. This valve has a valve body 52, a bore 53 which communicates with an annulus 54 so that the valve can discharge into the discharge system. Ball 55 is forced against seat 56 by spring 57. The valve is set to remain closed under normal operating pressure but if pressure exceeds the normal value the ball will unseat and the excess fluid will pass into the exhaust system.

The operating lever L may be pivoted as at 70 to a support bracket 71. A forked end 72 may be employed to engage thimble 73 and so operate the control rod C.

The clearances between the operating pads and the valve stems can be very small if great sensitivity is required. However, we prefer that the operating valve clearance be slightly greater than that of the check valve.

We have shown one construction in this detailed description for purposes of illustration, the construction being one which is relatively easy to manufacture and assemble. However, the various design details herein shown are not to be construed as limitations in the claims, the essense of the invention lying in the over-all association of parts rather than in the matters of conventional practice and design.

Having thus described the present invention so that others skilled in the art may be able to understand and practice the same, we state that what we desire to secure by Letters Patent is defined in what is claimed.

What we claim is:

1. A fluid servo unit comprising a body having a bore therein, a plunger slidably sealed in said bore, hydraulic operator means mechanically connected to said plunger, a movable control rod carrying a pad at either end of the plunger, said body having an inlet aperture for fluid under pressure and an outlet aperture for exhaust, the plunger having an annular recess communicating with said inlet aperture and a second annular recess communicating with the outlet aperture, said plunger having three lengthwise openings, one of said three openings communicating with said annular inlet recess, said opening being normally closed at each end by inwardly movable check valves having operating stems protruding outward, the second of said lengthwise openings having a piston therein with an operating stem extending longitudinally outward at one end, said piston being connected to a normally closed outwardly movable check valve in the other end, and the third opening having a piston and an outwardly movable normally closed check valve oppositely arranged from the piston and check valve in the second opening, the second and third lengthwise openings communicating with said annular exhaust recess, the operating stems of the pistons and the check valves being arranged in relation to said pads to cause the pads at each end in moving inward to strike first the piston stem for cracking the outwardly movable check valve and to strike second the adjacent check valve stem for opening the latter valve to admit pressure to the space at that end of said plunger and to produce motion of the plunger in the direction of the motion of the pad-carrying operating rod in response to fluid pressure admitted from the inlet port.

2. A fluid servo unit comprising a body having a bore therein, a follow-up plunger slidably sealed in said bore, a movable control rod carrying a pad at either end of the plunger, said body having an inlet aperture for fluid under pressure and an outlet aperture for exhaust, the plunger having a recess communicating with said inlet aperture, and a second recess communicating with the outlet aperture, said plunger having three lengthwise openings, one of said three openings communicating with said inlet recess, said one opening being normally closed at each end by inwardly movable check valves, the second of said lengthwise openings having a piston therein at one end connected to a normally closed outwardly movable check valve in the other end, and the third opening having a piston and an outwardly movable normally closed check valve oppositely arranged from the piston and check valve in the second opening, the second and third lengthwise openings communicating with said exhaust recess, said pistons and the check having means associated therewith for engagement by said pads and arranged to cause the pads at each end in moving inward to strike the piston means for cracking the outwardly movable check valve and to strike the adjacent check valve means for opening the latter valve to admit pressure to the space at that end of said plunger and to produce motion of the plunger in the direction of the motion of the pad-carrying operating rod in response to fluid pressure admitted from the inlet port.

3. A fluid servo unit comprising a body having a bore therein, a follow-up plunger slidably sealed in said bore, hydraulic operator means mechanically connected to said plunger, a movable control rod carrying a pad at either end of the plunger, said body having an inlet aperture for fluid under pressure and an outlet aperture for exhaust, the plunger having a recess communicating with said inlet aperture, and a second recess communicating with the outlet aperture, said plunger having three lengthwise openings, one of said three openings communicating with said inlet recess, said one opening being normally closed at each end by inwardly movable check valves, the second of said lengthwise openings having a piston therein at one end connected to a normally closed outwardly movable check valve in the other end, and the third opening having a piston and an outwardly movable normally closed check valve oppositely arranged from the piston and check valve in the second opening, the second and third lengthwise openings communicating with said exhaust recess, said pistons and the check having means associated therewith for engagement by said pads and arranged to cause the pads at each end in moving inward to strike the piston means for cracking the outwardly movable check valve and to strike the adjacent check valve means for opening the latter valve to admit pressure to the space at that end of said plunger and to produce motion of the plunger in the direction of the motion of the pad-carrying operating rod in response to fluid pressure admitted from the inlet port.

4. A fluid servo unit comprising a body having a bore therein, a follow-up plunger slidably sealed in said bore, hydraulic operator means mechanically connected to said plunger, a movable control rod carrying a pad at either end of the plunger, said body having an inlet aperture for fluid under pressure and an outlet aperture for exhaust, the plunger having a recess communicating with said inlet aperture, and a second recess communicating with the outlet aperture, said plunger having three lengthwise openings, one of said three openings communicating with said inlet recess, said one opening being normally closed at each end by inwardly movable check valves, the second of said lengthwise openings having a piston therein at one end connected to a normally closed outwardly movable check valve in the other end, and the third opening having a piston and an outwardly movable normally closed check valve oppositely arranged from the piston and check valve in the second opening, the second and third lengthwise openings communicating with said exhaust recess, said pistons and the check having means associated therewith for engagement by said pads and arranged to cause the pads at each end in moving inward to strike first the piston means for cracking the outwardly movable check valve and to strike second the adjacent check valve means for opening the latter valve to admit pressure to the space at that end of said plunger and to produce motion of the plunger in the direction of the motion of the pad-carrying operating rod in response to fluid pressure admitted from the inlet port.

ROY O. BALOGH.
GEORGE H. HUFFERD.

REFERENCES CITED

The following references are of record in the file of this patent:

UNITED STATES PATENTS

| Number | Name | Date |
| --- | --- | --- |
| 278,018 | Hudson | May 22, 1883 |
| 1,328,437 | Lang | Jan. 20, 1920 |
| 1,770,194 | Bragg | July 8, 1930 |
| 2,005,971 | Edwards | June 25, 1935 |
| 2,016,931 | Richard | Oct. 8, 1935 |
| 2,376,804 | Orshansky | May 22, 1945 |